US010880088B1

(12) United States Patent
Gorman

(10) Patent No.: US 10,880,088 B1
(45) Date of Patent: Dec. 29, 2020

(54) DATA COMMUNICATION TARGET CONTROL WITH CONTACT TOKENS

(71) Applicant: Sprint Communications Company L.P., Overland Park, KS (US)

(72) Inventor: Pierce Andrew Gorman, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 261 days.

(21) Appl. No.: 16/162,248

(22) Filed: Oct. 16, 2018

(51) Int. Cl.
| | | |
|---|---|---|
| *H04M 3/38* | (2006.01) | |
| *H04L 9/32* | (2006.01) | |
| *H04L 29/08* | (2006.01) | |
| *H04L 9/30* | (2006.01) | |
| *H04L 29/06* | (2006.01) | |

(52) U.S. Cl.
CPC ............ *H04L 9/3213* (2013.01); *H04L 9/30* (2013.01); *H04L 63/0428* (2013.01); *H04L 67/146* (2013.01)

(58) Field of Classification Search
CPC ....... H04L 29/06; H04L 63/101; H04L 67/42; H04L 29/06027; H04L 63/0823; H04L 65/1069; H04L 65/4007; H04M 3/382; H04M 7/006; H04M 15/00; H04M 15/49; H04M 15/56; H04M 2215/202; H04M 2215/46; H04M 3/38
See application file for complete search history.

(56) References Cited

U.S. PATENT DOCUMENTS

| | | | |
|---|---|---|---|
| 8,261,091 B2 | 9/2012 | Barck et al. | |
| 8,341,714 B2 | 12/2012 | Muller et al. | |
| 8,352,725 B1 * | 1/2013 | O'Toole, Jr. | ............ H04L 63/20 713/151 |
| 8,549,602 B2 | 10/2013 | Vaeth | |
| 2002/0112187 A1 * | 8/2002 | Dalton, Jr. | .......... H04L 63/0823 726/14 |
| 2009/0094318 A1 | 4/2009 | Gladwin et al. | |
| 2009/0150984 A1 * | 6/2009 | Dalton, Jr. | ............ H04L 63/126 726/7 |

(Continued)

FOREIGN PATENT DOCUMENTS

| | | |
|---|---|---|
| WO | 2017220115 A1 | 12/2017 |
| WO | 2018109598 A1 | 6/2018 |

OTHER PUBLICATIONS

Atis, et al.; "Joint ATIS/SIP Forum Standard—Signature-Based Handling of Asserted Information Using ToKENs (SHAKEN)"; Jan. 5, 2017; 16 pages; ATIS-1000074; U.S.A.

*Primary Examiner* — Olugbenga O Idowu

(57) ABSTRACT

A target transceiver transfers target instructions to a control server that associates a data source with contact information, conditions, and tokens. The target transceiver transfers the contact tokens to a source transceiver for the data source. The source transceiver encrypts and transfers a data target ID and the token to the control server. The control server receives and decrypts the data target ID and the token and identifies the data source, the data target, and the conditions. The control server processes the conditions to select a portion of the contact information and transfers the selected portion of the contact information to the source transceiver. The source transceiver transfers the user data to the target transceiver based on the selected contact information.

20 Claims, 7 Drawing Sheets

(56) References Cited

U.S. PATENT DOCUMENTS

2011/0296513 A1  12/2011  Kasad
2018/0139042 A1   5/2018  Binning et al.
2018/0197156 A1   7/2018  Beesley et al.

\* cited by examiner

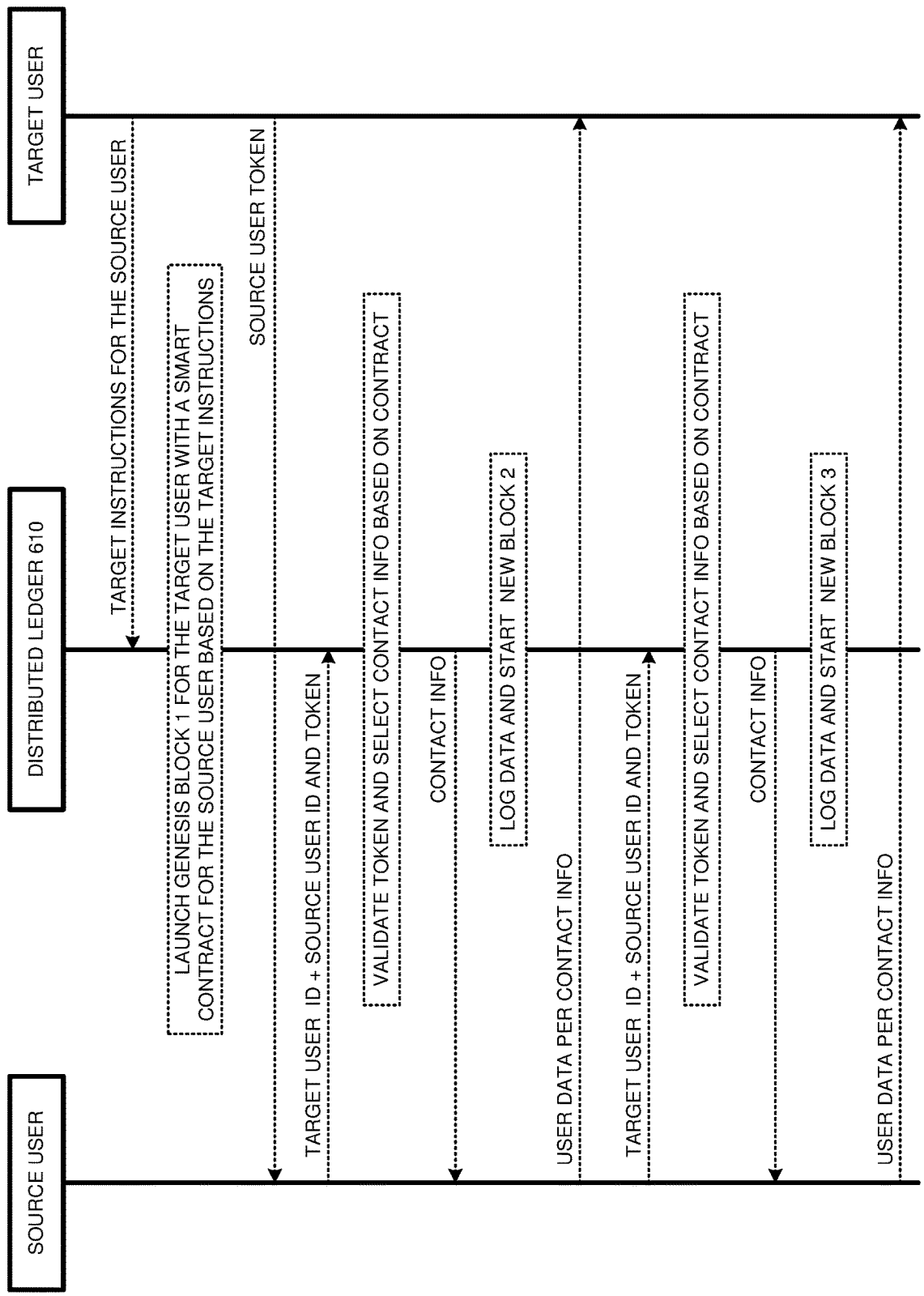

US 10,880,088 B1

DATA COMMUNICATION TARGET CONTROL WITH CONTACT TOKENS

TECHNICAL BACKGROUND

Data communication networks serve user communication devices with data services like voice calling, video calling, short messaging, emailing, and social networking. User communication devices usually maintain a contact list that includes contact information for other users. The contact information includes telephone numbers, email addresses, short message codes, network names, and the like. In many cases, the target user provides their contact information to the source users. In other scenarios, the source users discover the contact information to the target users.

To communicate from a source user to a target user, the source user uses a telephone number, email address, short message code, or the like to send user data to the target user. The target user often learns the identity of the source using caller ID or a source message field. The target user may block calls or delete unread message from some source users. Unfortunately, the source of many data communications is not accurately provided. Moreover, contact information for target users is readily discoverable by these anonymous sources.

Telephone directories are a classic form of contact information discovery. Target user web sites also provide contact information the target users. Telephony databases like Service Control Points (SCPs) support contact information discovery by translating well-known 800 numbers into actual telephone numbers for calling the target users. Domain Name Service (DNS) databases support contact information discovery by translating well-known network names like uspto.gov into Internet Protocol (IP) addresses for packet data transfer to target users.

Telephone Number Mapping (ENUM) servers host a variety of contact information for target users like telephone numbers, email addresses, short message codes, network names or the like. A target user may prioritize their ENUM data for specific users. A target user may require an access code from some source users. For a given target user, the ENUM server may return a target phone number to one source user and return a target email address another source user.

Unfortunately, ENUM servers, DNS databases, SCPs and the like are not easy to use for target users. Current contact information databases do not effectively and efficiently implement target user instructions. These contact information databases do not adequately support encryption or source user identification.

TECHNICAL OVERVIEW

A target transceiver transfers target instructions to a control server that associates a data source with contact information, conditions, and tokens. The target transceiver transfers the contact tokens to a source transceiver for the data source. The source transceiver encrypts and transfers a data target ID and the token to the control server. The control server receives and decrypts the data target ID and the token and identifies the data source, the data target, and the conditions. The control server processes the conditions to select a portion of the contact information and transfers the selected portion of the contact information to the source transceiver. The source transceiver transfers the user data to the target transceiver based on the selected contact information.

DESCRIPTION OF THE DRAWINGS

FIG. 7 illustrates the operation of distributed ledger 610 to control communications between a source user and a target user.

DETAILED DESCRIPTION

Figure 1:
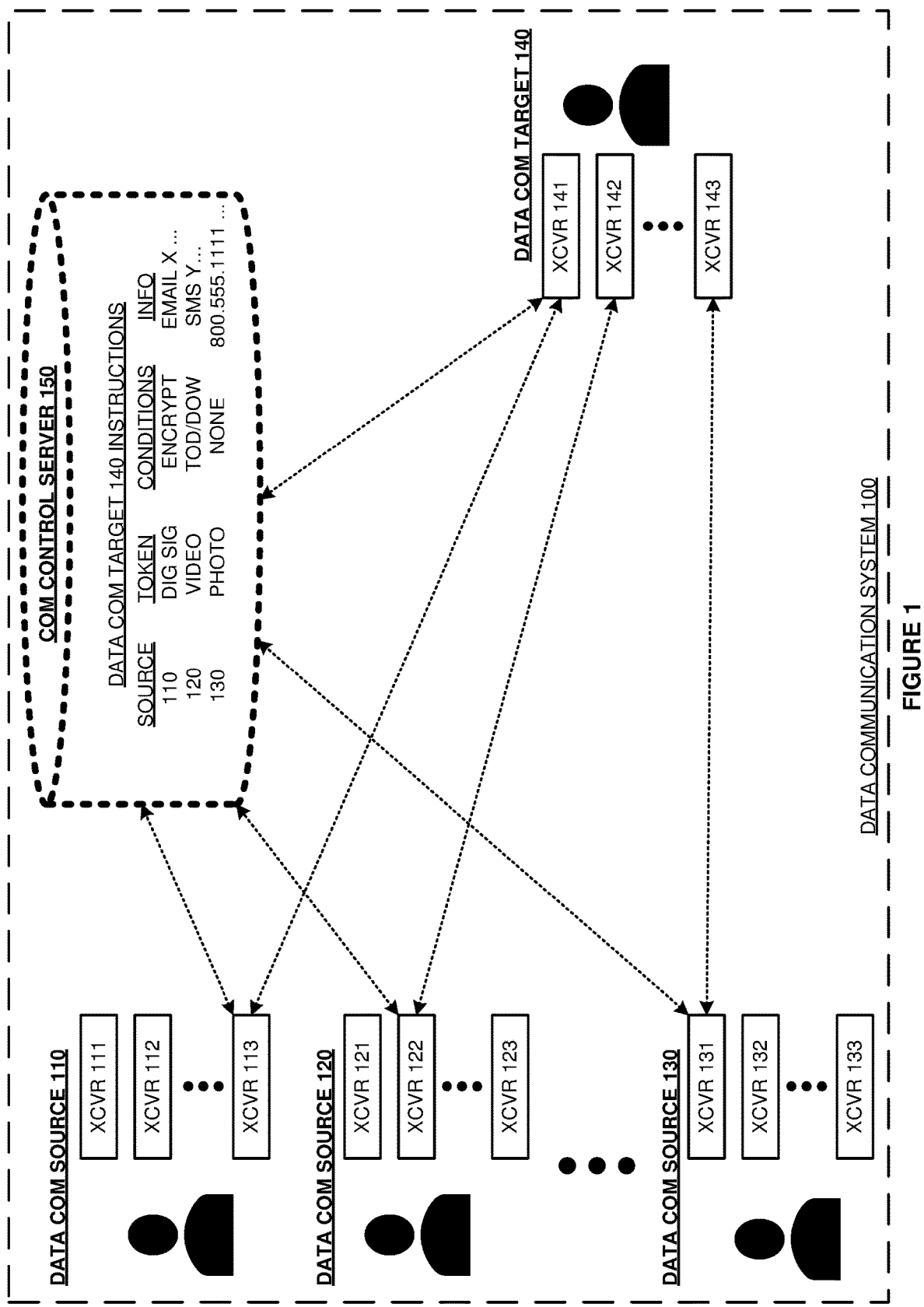
FIG. 1 illustrates a data communication system that controls data communications between data communication sources and a data communication target.

FIG. 1 illustrates data communication system 100 that controls data communications from data communication sources 110, 120, and 130 to data communication target 140. Data communication sources 110, 120, and 130 comprise respective transceivers (XCVRs) 111-113, 121-123, 131-133. Data communication target 140 comprises transceivers 141-143. Data communication sources 110, 120, and 130 and data communication target 140 each have operators that are depicted as people, but the operators might be machines with data communication components. Data communication system 100 comprises transceivers 111-113, 121-123, 131-133, 141-143, and communication control server 150. The number of data communication sources, data communication targets, communication control servers, and source/target transceivers has been restricted for clarity and would typically vary from the amount shown.

Transceivers 111-113, 121-123, 131-133, and 141-143 comprise computers, phones, watches, headsets, or some other data communication apparatus. Transceivers 111-113, 121-123, 131-133, and 141-143 execute user applications like voice calling, video conferencing, text messaging, interactive gaming, multi-media messaging, e-mailing, audio/video streaming, and the like. Although transceivers 111-113, 121-123, 131-133, and 141-143 are wireless communication devices or dual wireless/landline communication devices, some of the transceivers may be landline-only communication devices.

Transceivers 111-113, 121-123, 131-133, and 141-143 comprise processing circuitry, memory circuitry, user interface circuitry, transceiver circuitry, bus circuitry, and software. The processing circuitry comprises Central Processing Units (CPUs), Graphic Processing Units (GPUs), Application Specific Integrated Circuits (ASICs), and/or some other type of computing apparatus. The memory circuitry comprises cache, flash drives, disk drives, and/or some type of other data storage. The user interface circuitry comprises graphic displays, touchscreens, microphones, speakers, buttons, lights, vibrators, and/or some other type of communication interface. The transceiver circuitry comprises radios, Input/Output (I/O) data ports, Network Interface Cards (NICs), optical interfaces, and/or some other type of communication circuitry. The bus circuitry comprises metallic cabling, server backplanes, wireless links, optical fibers, and/or some other type of data communication media. The software includes an operating system, user applications, and communication applications.

Communication control server 150 comprise processing circuitry, memory circuitry, transceiver circuitry, bus circuitry, and software. The processing circuitry comprises CPUs, GPUs, ASICs, and/or some other type of computing apparatus. The memory circuitry comprises cache, flash drives, disk drives, tape drives, and/or some type of other data storage. The transceiver circuitry comprises I/O data ports, NICs, optical interfaces, and/or some other type of communication circuitry. The bus circuitry comprises metallic cabling, server backplanes, wireless links, optical fibers, and/or some other type of data communication media. The software includes an operating system and communication control applications. Communication control server 150 and transceivers 111-113, 121-123, 131-133, and 141-143 exchange control data over data communication networks that are depicted by dotted lines with arrows. Some of the data communication networks include Radio Access Networks (RANs).

Communication control server 150 may comprise a Telephone Number Mapping (ENUM) server. The token and target ID could be transferred in the option field of an ENUM resource request message. The selected contact information could be transferred in an ENUM resource response message.

In operation, data communication target 140 generates target instructions to control data communications from data communication sources 110, 120, and 130 to transceivers 140-143. The target instructions individually associate data communication sources 110, 120, and 130 with contact information, contact conditions, and contact tokens for data communication target 140. The contact information comprises telephone numbers, email addresses, Uniform Resource Indicators (URIs), network names, Internet Protocol (IP) addresses, IP ports, Ethernet addresses, and/or some other type of communications data. The contact conditions control data communications based on the data communication source, contact token, time-of-day, day-of-week, day-of-year, source location, target location, source transceiver, target transceiver, and the like. The contact conditions control the form of communication like calling, texting, e-mailing, or social networking. The contact conditions control communication parameters like protocol, encryption, transceiver, and the like.

The contact tokens may be codes, keys, digital signatures, images, videos, audio, text, and the like. The contact tokens typically have a Time-To-Live (TTL). In some examples, a human user interacts with transceiver 141 to develop the target instructions, and in other examples, a machine user transfers a data file to transceiver 141 that specifies the target instructions for data communication sources 110, 120, and 130. Transceiver 141 transfers the target instructions to communication control server 150. In many examples, control server 150 and transceiver 141 use encryption to verify the identity of data communications target 140 and transceiver 141. For example, transceiver 141 may use a public key to encrypt the target instructions, and control server may 150 decrypt the target instructions with a private key that only works for data communication target 140 and perhaps transceiver 141.

Communication control server 150 stores the target instructions. Although actual target instructions will vary in practice, exemplary target instructions are shown in control server 150 for illustrative purposes. Data communication source 110 has a digital signature as its token and is required to encrypt. Data communication source 110 should email address X to communicate with target 140 and other some alternative contact data may be listed. Data communication source 120 has a video clip as its token and has Time-of-Day (TOD) and Day-of-Week (DOW) restrictions. Data communication source 120 should use Short Message Service (SMS) to text to telephone number Y to communicate with target 140 and other some alternative contact data may be listed. Data communication source 130 has a photograph for target 140 as its token and has no restrictions. Data communication source 130 should call 800-555-1111 to communicate with target 140 and other some alternative contact data may be listed.

Data communication target 140 uses transceiver 141 to transfer the digital signature token to transceiver 113 for data communication source 110. Data communication target 140 uses transceiver 142 to transfer the video token to transceiver 122 for data communication source 120. Data communication target 140 uses transceiver 143 to transfer the photograph token to transceiver 131 for data communication source 130. Eventually, TTLs for the tokens expire and data communication target 140 replenishes the existing tokens at control server 150 or transmits new tokens to control server 150 and to the selected data communication sources.

When data communication source 110 wants to transfer data to data communication target 140, data communications source 140 uses transceiver 113 to encrypt and transfer an ID for target 140 and the digital signature token to communication control server 150. The target 140 ID may comprise an International Telecommunications Union (ITU) E.164 number. Control server 150 and transceiver 113 use encryption to verify the identity of data communications source 110 and transceiver 113. For example, transceiver 113 may use a public key to encrypt the information request, and communication control server may 150 decrypt the information request with a private key that only works for data communication source 110 and perhaps transceiver 113. Communication control server 150 receives and decrypts the ID and tokens from data communication source 110 for data communication target 140. Communication control server 150 validates the token by decrypting the digital signature with a key for target 140.

Communication control server 150 uses the target ID to find the appropriate contact conditions and information. Communication control server 150 processes the contact conditions to select individual contact information for data communication source 110. In this illustrative example, control server 150 uses the ID for data communication target 140 to find the target instructions and validate the digital signature token. Control server 150 processes the conditions and contact information to retrieve the encryption requirement and email address X. Communication control server 150 encrypts and transfers the encryption requirement and the email address to transceiver 113 of data communication source 110. Transceiver 113 responsively transfers encrypted data communications for data communication target 140 to email address X. Transceiver 141 receives the email and decrypts the data for presentation to the user of data communication target 140.

When data communication source 120 wants to transfer data to data communication target 140, data communications source 120 uses transceiver 122 to encrypt and transfer an ID for target 140 and the video token to communication control server 150. The target 140 ID may comprise an ITU E.164 number. Control server 150 and transceiver 122 use encryption to verify the identity of data communications source 120 and perhaps transceiver 122. For example, transceiver 111 may use a private key to encrypt the information request, and communication control server may 150 decrypt the information request with a public key that only works for data communication source 120 and perhaps transceiver 122. Communication control server 150 receives and decrypts the ID and tokens from data communication source 120 for data communication target 140. Communication control server 150 validates the token by matching the video clip with a stored video clip from target 140.

Communication control server 150 uses the target ID to find the appropriate contact conditions and information. Communication control server 150 processes the contact conditions to select individual contact information for data communication source 120. In this illustrative example, control server 150 uses the ID for data communication target 140 to find the target instructions and validate the video token. Control server 150 processes the conditions and contact information to retrieve the time and date restrictions. If the current time or date are not OK, then control server 150 does not respond or responds with instructions but not any contact information. If the time and date are OK, then control server 150 processes the conditions and contact information to retrieve SMS number Y. Communication control server 150 encrypts and transfers the SMS number to transceiver 122 of data communication source 120. Transceiver 122 responsively sends user data to data communication target 140 with SMS number Y. Transceiver 142 receives the SMS message and presents the user data to the user of data communication target 140.

When data communication source 130 wants to transfer data to data communication target 140, data communications source 130 uses transceiver 131 to encrypt and transfer an ID for target 140 and the photograph token to communication control server 150. Control server 150 and transceiver 122 use encryption to verify the identity of data communications source 120 and perhaps transceiver 131. For example, transceiver 131 may use a shared secret key to encrypt the information request, and communication control server may 150 decrypt the information request with a shared secret key that only works for data communication source 130 and perhaps transceiver 131. Communication control server 150 receives and decrypts the ID and token from data communication source 130 for data communication target 140. Communication control server 150 validates the token by matching the photograph with a stored photograph from target 140.

Communication control server 150 uses the target ID to find the appropriate contact conditions and information. Communication control server 150 processes the contact conditions to select individual contact information for data communication source 130. In this illustrative example, control server 150 uses the ID for data communication target 140 to find the target instructions and validate the photo token. Control server 150 processes the conditions (none) and contact information to retrieve the 800 telephone number. Communication control server 150 encrypts and transfers the 800 number to transceiver 131 of data communication source 130. Transceiver 131 responsively calls the 800 number and transfers voice data to data communication target 140. Transceiver 143 answers the call and plays the voice data to the user of data communication target 140. Transceiver 143 typically encrypts and transfers voice data to data communication source 131.

In some examples, control server 140 executes smart contracts in a distributed ledger to validate and process the information requests and to select and transfer the contact information. The smart contracts execute target instructions for the data communication given source/target user pair.

Figure 2:
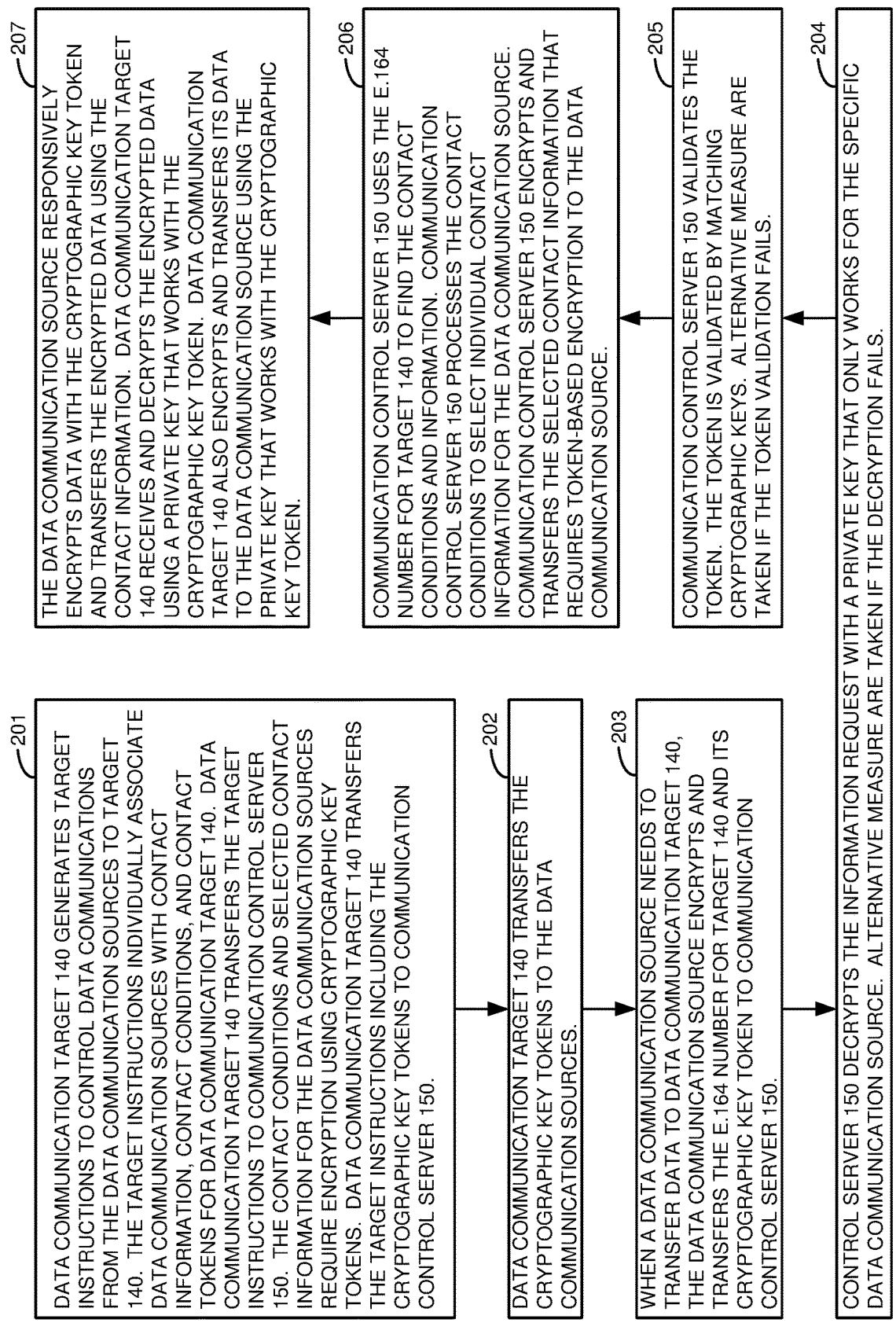
FIG. 2 illustrates the operation the data communication system to control data communications between the data communication sources and the data communication target.

FIG. 2 illustrates the operation of data communication system 100 to control communications from data communication sources to data communication target 140. The operation is exemplary, and control server 150 may operate differently. Data communication target 140 generates target instructions to control data communications from the data communication sources to target 140 (201). The target instructions individually associate data communication sources with contact information, contact conditions, and contact tokens for data communication target 140. Data communication target 140 transfers the target instructions to communication control server 150. In this illustrative example, the contact conditions and selected contact information for the data communication sources require encryption using cryptographic key tokens. Data communication target 140 transfers the target instructions including the cryptographic key tokens to communication control server 150. Data communication target 140 also transfers the cryptographic key tokens to the data communication sources (202).

When a data communication source needs to transfer data to data communication target 140, the data communication source encrypts and transfers the E.164 number for target 140 and its cryptographic key token to communication control server 150 (203). Control server 150 decrypts the information request with a private key that only works for the specific data communication source (204). Alternative measure are taken if the decryption fails. Communication control server 150 then validates the token (205). In this example, the token is validated by matching cryptographic keys. Alternative measure are taken if the token validation fails.

Communication control server 150 uses the E.164 number for target 140 to find the contact conditions and information (206). Communication control server 150 processes the contact conditions to select individual contact information for the data communication source information that requires token-based encryption. Communication control server 150 encrypts and transfers the selected contact information to the data communication source. The data communication source responsively encrypts data communications with the cryptographic key token and transfers the encrypted data using the contact information (207). For example, the data communication source may place a video call to data communication target 140 and then encrypt the video with the cryptographic key token. Data communication target 140 receives and decrypts the encrypted data using a private key that works with the cryptographic key token.

Data communication target 140 also encrypts and transfers its data to the data communication source using the private key that works with the cryptographic key token. Eventually, TTLs for the cryptographic key tokens expire and data communication target 140 replenishes the existing cryptographic key tokens at control server 150 or transmits new cryptographic key tokens to control server 150 and to the selected data communication sources.

Figure 3:
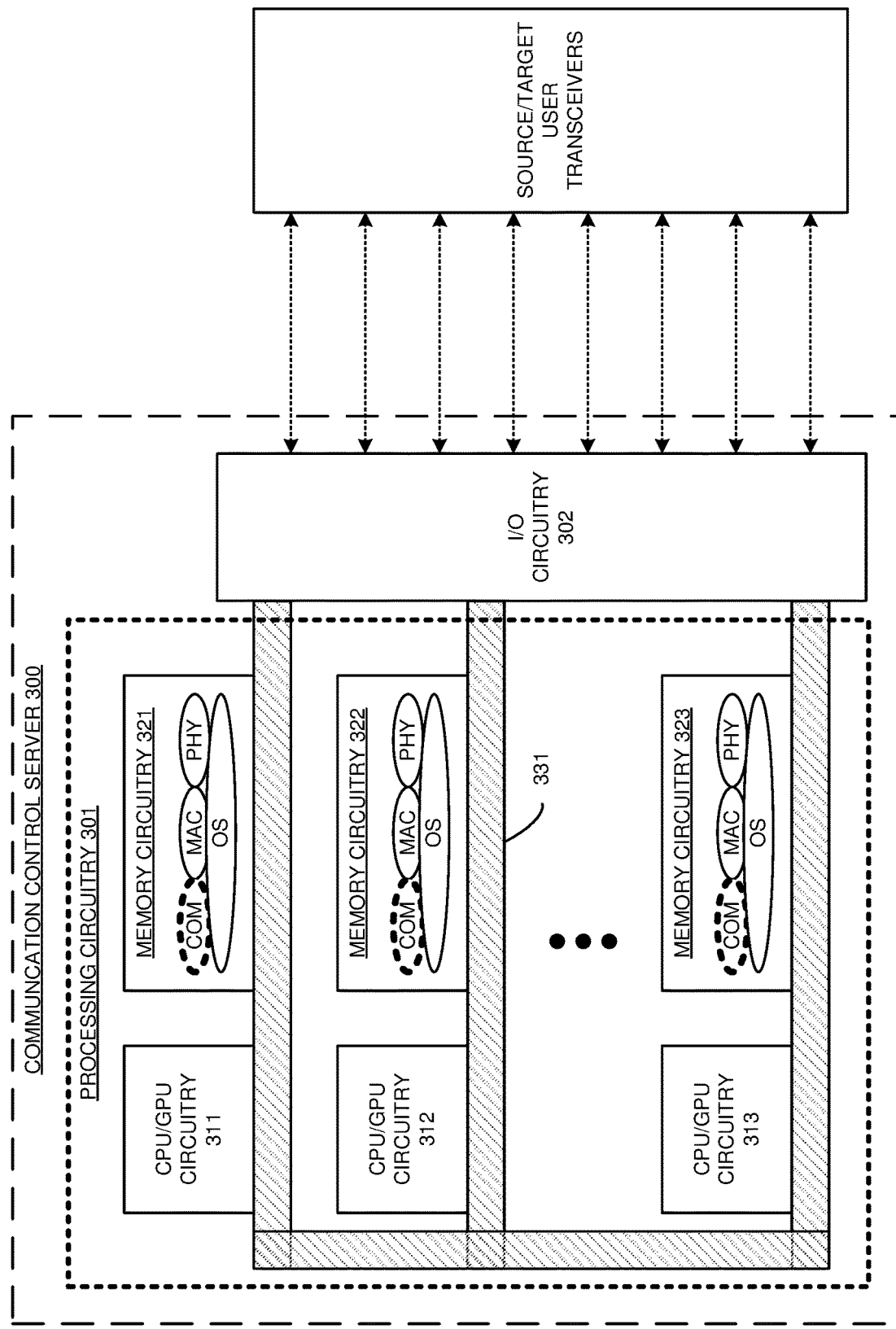
FIG. 3 illustrates a communication control server to control data communications between data communication sources and targets.

FIG. 3 illustrates communication control server 300 to control communications between data communication sources and data communication targets. Communication control server 300 is exemplary, and control server 150 may be configured and operate differently. Communication control server 300 comprises processing circuitry 301 and I/O circuitry 302. I/O circuitry 302 exchanges control data with various source/target user transceivers. Processing circuitry 301 comprises CPU/GPU circuitry 311-313, memory circuitry 321-323, and bus circuitry 331. Memory circuitry 321-323 each store an operating system (OS), PHY, MAC, and communication control application (COM). Bus circuitry 331 couples CPU/GPU circuitry 311-313, memory circuitry 321-323, and I/O circuitry 302.

CPU/GPU circuitry 311-313 executes the OS, communication control application, PHY, MAC, and possibly other networking software to exchange control data with the user transceivers over I/O circuitry 302. The communication control application controls data communications from the source user transceivers to the target user transceivers. In some examples, communication control server 300 may execute smart contracts in a distributed ledger to validate and process information requests and to select and transfer contact information. In some examples, communication control server 300 comprises a Telephone Number Mapping (ENUM) server.

I/O circuitry 302 receives encrypted target instructions from the target user transceivers. The target instructions associate individual source users with contact information, contact conditions, and contact tokens for individual target users. For example, the target instructions may individually associate a given target user E.164 number with multiple source user E.164 numbers, source user conditions, and source user tokens. Although the tokens may vary in other examples, the tokens comprise photographs with a TTL in this example. I/O circuitry 302 transfers the encrypted target instructions to memory circuitry 321-323. CPU/GPU circuitry 311-313 decrypts the target instructions. For example, a target user may use a public key to encrypt its target instructions, and control server 300 decrypts the target instructions with a private key that only works for that target user. Alternative measures are taken when the decryption of the target instructions fails for a target user.

I/O circuitry 302 receives encrypted information requests from the source user transceivers. A specific information request indicates the source user E.164 number, the target user E.164 number, and the photographic contact token. I/O circuitry 302 transfers the information requests memory circuitry 321-323. CPU/GPU circuitry 311-313 decrypts and the information requests. For example, a source user transceiver may use a public key to encrypt its information request, and control server 300 decrypts the source request with a private key that only works for that source user transceiver. Alternative measures are taken when the decryption of an information request fails for a source user.

In control server 300, the communication control application identifies the target user responsive to the target user ID and identifies the target instructions from the target user for the source user. Control server 300 validates the photographic token from the source user by matching the photograph with a photograph from the target instructions from the target user. Control server 300 also validates the photographic token by checking for a non-expired TTL. Alternative measures are taken when the token validation fails for a source user. The communication control application processes the conditions and contact information for the target user to select a portion of the contact information for transfer to the source user. Alternative measures are taken when the conditions indicate that no contact information should be sent.

CPU/GPU circuitry 311-313 encrypts the selected contact information and directs memory circuitry 321-323, bus circuitry 331, and I/O transceiver 302 to transfer the encrypted contact information to the requesting source user. For example, control server 300 may transfer an office telephone number for the target user during business hours or transfer a wireless telephone number for the target user outside of business hours. The contact information may instruct the source user transceiver to use encryption for data communications with the target user. When a TTL for a photographic token expires, control server 300, notifies the target user. The target user may then replenish the existing token at control server 300, or the target user may transmit a new token to control server 300 and to the source user.

Figure 4:
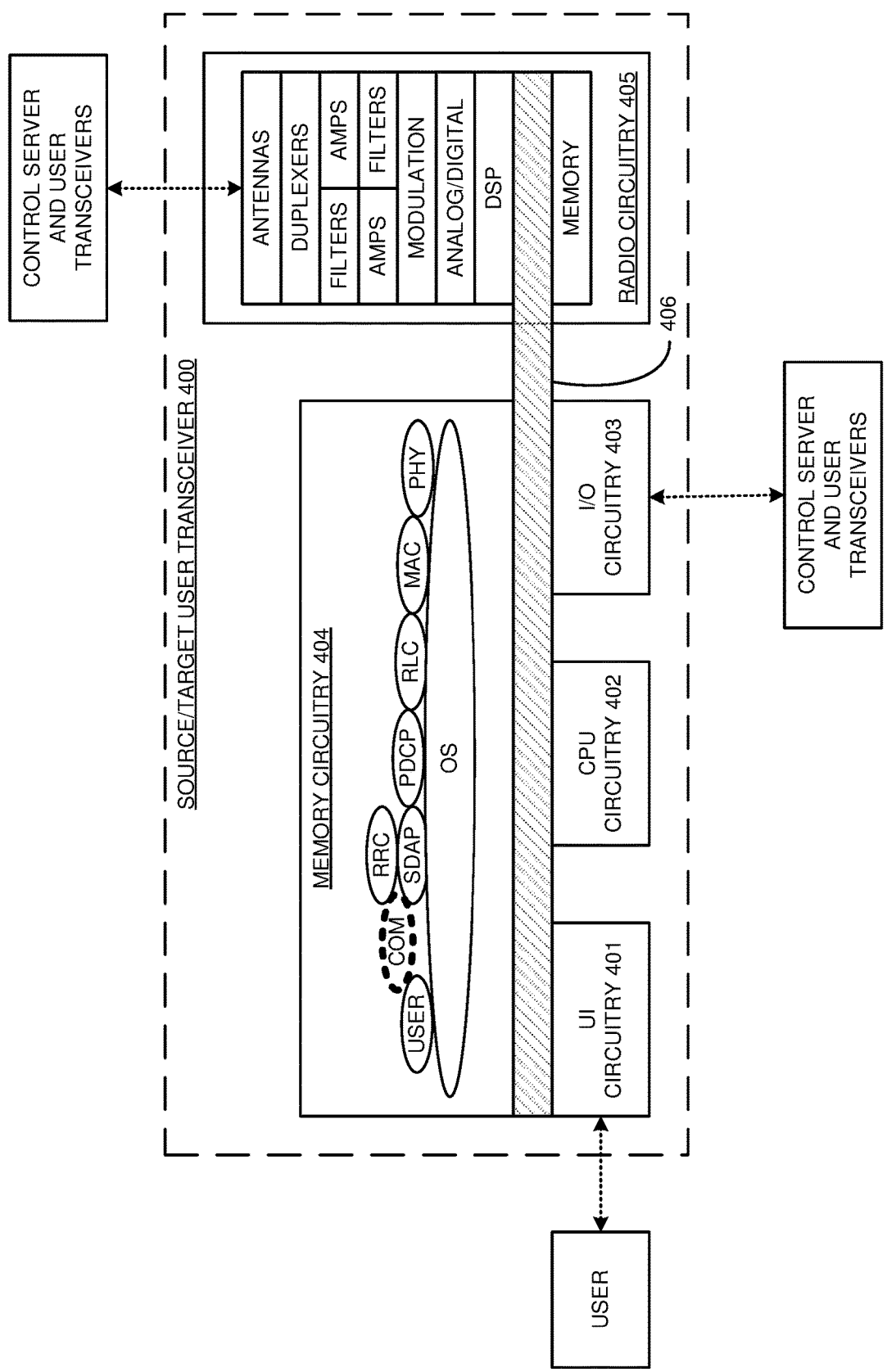
FIG. 4 illustrates a source/target user transceiver that controls data communications with other source/target transceivers.

FIG. 4 illustrates a source/target user transceiver 400 that communicates with other source/target transceivers. Source/target user transceiver 400 is exemplary, and user transceivers 111-113, 121-123, 131-133, and 141-143 may be configured and operate differently. User transceiver 400 comprises User Interface (UI) circuitry 401, CPU circuitry 402, I/O circuitry 403, memory circuitry 404, radio circuitry 405, and bus circuitry 406. Bus circuitry 406 couples radio circuitry 405, memory circuitry 404, I/O circuitry 403, CPU circuitry 402, and UI circuitry 401. Radio circuitry 405 comprises antennas, duplexers, filters, amplifiers, modulation, analog/digital interfaces, DSP, memory, and typically other components. The memory in radio circuitry 405 stores DSP firmware/software.

I/O circuitry 403 comprises data ports, NICs, or some other type of transceiver. The operating system and I/O circuitry 403 use data networking protocols like Institute of Electrical and Electronic Engineers 802.3 (Ethernet) and Internet Protocol (IP). I/O circuitry 403 exchanges tokens and user data with other user transceivers over landline data networks. I/O circuitry 403 transfers target instructions and information requests to communication control servers and receives selected contact information from the communication control servers over the landline data networks.

Memory circuitry 404 stores an operating system, user applications (USER), and a communication control application (COM). Memory circuitry 404 stores wireless networking applications like Physical Layer (PHY), Media Access Control (MAC), Radio Link Control (RLC), Packet Data Convergence Protocol (PDCP), Radio Resource Control (RRC), Service Data Application Protocol (SDAP), and the like. The wireless networking applications and radio circuitry 405 use wireless network protocols like Fifth Generation New Radio (SGNR), Long Term Evolution (LTE), and Institute of Electrical and Electronic Engineers 802.11 (WIFI). Radio circuitry 405 exchanges tokens and user data with other user transceivers over wireless data networks. Radio circuitry 405 transfers target instructions and information requests to communication control servers and receives selected contact information from the communication control servers over the wireless data networks.

CPU circuitry 402 executes the operating system and communication control application. The communication control application directs the operating system to drive UI circuitry 401 to interact with the user to receive target instructions and communication requests. The target instructions associate individual data communication sources with contact information, contact conditions, and contact tokens. The communication control application encrypts the target instructions with a public key for transceiver 400. The communication control application directs the operating system to drive I/O circuitry 403 or radio circuitry 405 to transfer the encrypted target instructions to a communication control server. The communication control application directs the operating system to drive I/O circuitry 403 or radio circuitry 405 to transfer the contact tokens to the source users.

When a user application requires data communications to a target user, the communication control application encrypts an information request for the target user with a public key for transceiver 400. The communication control application directs the operating system to drive I/O circuitry 403 or radio circuitry 405 to transfer the encrypted information request to a communication control server. I/O circuitry 403 or radio circuitry 405 receives encrypted contact information for the target user from the communication control server and transfers the encrypted contact information to memory circuitry 404. The communication control application decrypts the contact information for the target user. The communication control application receives user data from the user application and encrypts the user data using a public key for the target user. The public key may be provided in the contact information. The communication control application directs the operating system to drive I/O circuitry 403 or radio circuitry 405 to transfer the encrypted user information to the target user using the contact information.

Typically, I/O circuitry 403 or radio circuitry 405 receives encrypted user information from the target user and transfers the encrypted user information to memory circuitry 404. The communication control application decrypts the user information from the target user with a public key for the target user. The user application directs the operating system to drive I/O circuitry 401 to present the user information to the user.

When user transceiver 400 is a target, I/O circuitry 403 or radio circuitry 405 receive encrypted user information from source users and transfers the encrypted user information to memory circuitry 404. The communication control application decrypts the user information with private keys for the target user. The user application directs the operating system to drive UI circuitry 401 to present the user data to the target user.

The circuitry described above comprises computer hardware and software that form a special-purpose machine—communications circuitry that intelligently controls access to data communication targets. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose communications circuitry that intelligently controls access to data communication targets.

Figure 5:
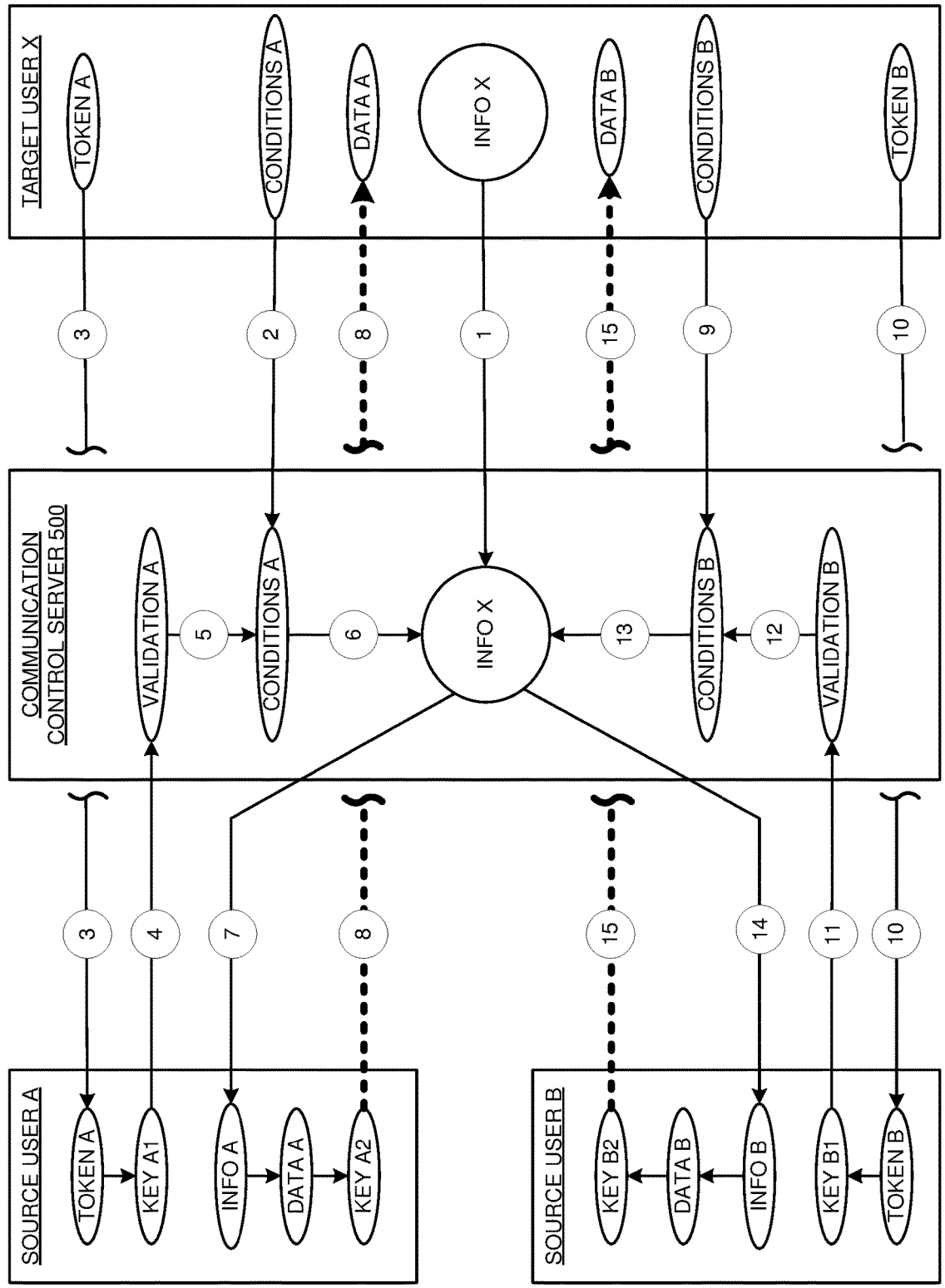
FIG. 5 illustrates the operation of a communication control server to control communications between source users and a target user.

FIG. 5 illustrates the operation of a communication control server 500 to control communications from source user A and source user B to target user X. The operation is exemplary and data communication system 100 may operate differently. First, target user X encrypts and transfers their contact information X to communication control server 500. Second, target user X encrypts and transfers their conditions A with token A for source user A to communication control server 500. Third, target user X encrypts and transfers token A to source user A. Fourth, source user A encrypts an information request having token A and an ID for target user X with key A1 and transfers the encrypted information request to communication control server 500 which decrypts the information request to authenticate source user A. Fifth, communication control server 500 validates token A based on stored token A from target user X. Sixth, communication control server 500 processes conditions A to select contact information X for source user A (and the selected contact information X is then referred to as contact information A). Seventh, communication control server 500 encrypts and transfers contact information A to source user A. Eighth, source user A processes contact information A to encrypt data A with key A2 and transfer encrypted data A to target user X.

Ninth, target user X transfers encrypts and transfers their conditions B with token B for source user B to communication control server 500. Tenth, target user X encrypts and transfers token B to source user B. Eleventh, source user B encrypts an information request having token B and target user X ID with key B1 and transfers the encrypted information request to communication control server 500 which decrypts the information request to authenticate source user B. Twelfth, communication control server 500 validates token B based on stored token B from target user X. Thirteenth, communication control server 500 processes conditions B to select contact information X for source user B (contact information B). Fourteenth, communication control server 500 encrypts and transfers contact information B to source user B. Fifteenth, source user B processes contact information B to encrypt data B with key B2 and transfer encrypted data B to target user X.

Figure 6:
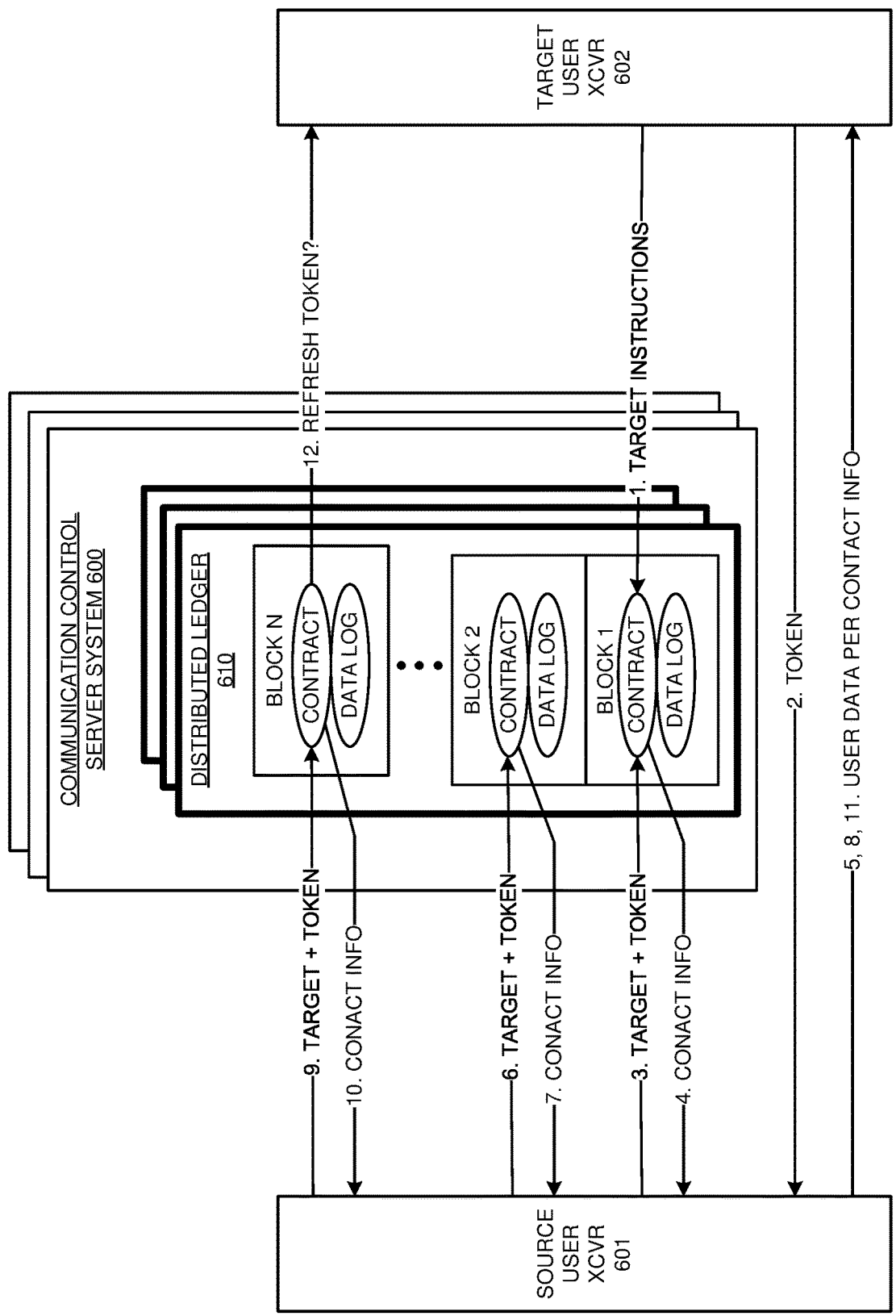
FIG. 6 illustrates a communication control server having a distributed ledger.

FIG. 6 illustrates communication control server system 600 having distributed ledger 610. Communication control server 600 is exemplary, and control server 150 may be configured and operate differently. Communication control server system 600 comprises several networked computers that each execute and maintain their own version of distributed ledger 610. The networked computers communicate among one another to reach consensus on target instructions, information requests, and selected contact information. Various types of distributed ledger computers, networks, and consensus protocols are available and could be used. Thus, the distributed ledger operations described herein are duplicated across the networked computers based on consensus. Distributed ledger 610 comprises blocks 1-N. Blocks 1-N each comprise a smart contract having conditions and a data log. Although not shown for clarity, blocks 1-N have hashes, nonces, roots, and the like—and blocks 2-N have a hash of the previous block. The smart contract is immutable from block to block, but the logged data may vary.

Initially, target user transceiver 602 encrypts and transfers target instructions to distributed ledger 610 which only has block 1 at this point. The smart contract in block 1 decrypts and stores the target instructions. Target user transceiver 602 encrypts and transfers a token to source user transceiver 601. To communicate with target user transceiver 602, source user transceiver 601 encrypts and transfers the token and a target user ID to block 1 in distributed ledger 610. The smart contract in block 1 decrypts and validates the token. The smart contract processes the conditions to select contact information. The smart contract encrypts and transfers the selected contact information to source user transceiver 601. The smart contract logs data for the transaction like user IDs, tokens, times, contact info, and the like. The smart contract then launches new block 2 to handle the next transaction. Source user transceiver 601 encrypts and transfers user data to target user transceiver 602 per the contact information.

To communicate again with target user transceiver 602, source user transceiver 601 encrypts and transfers the token and target user ID to block 2 in distributed ledger 610. The smart contract in block 2 decrypts and validates the token. The smart contract processes the conditions to select contact information. The smart contract encrypts and transfers the select contact information to source user transceiver 601. The smart contract logs data for the second transaction like user IDs, tokens, times, contact info, and the like. The smart contract then launches new block 3 to handle the next transaction. Source user transceiver 601 encrypts and transfers user data to target user transceiver 602 per the contact information.

For the Nth communication with target user transceiver 602, source user transceiver 601 encrypts and transfers the token and target user ID to block N in distributed ledger 610. The smart contract in block N decrypts and validates the token—although the token is now exhausted. The smart contract processes the conditions to select contact information. The smart contract encrypts and transfers the selected contact information to source user transceiver 601. The smart contract logs data for the Nth transaction like user IDs, tokens, times, contact info, and the like. The smart contract indicates to target user transceiver 602 that the token for the source user is exhausted. If the token is not refreshed, then block N 610 logs the event but does not launch a new block and will not respond to source transceiver 601. If the token is refreshed, then block N logs the event and launches new block N+1 to handle the next transaction. If a new token, condition, or contact information is provided by target user transceiver 602, then communications control server 600 would launch a new distributed ledger for the source user and the target user.

FIG. 7 illustrates the operation of distributed ledger 610 to control communications between the source user and the target user. The operation is exemplary and control server 150 may operate differently. The target user encrypts and transfers target instructions for the source user to distributed ledger 610. Distributed ledger 610 decrypts the target instructions and launches block 1 having a smart contract based on the target instructions. The target user encrypts and transfers a token to the source user. To communicate with the target user, the source user encrypts and transfers the token and target user ID to distributed ledger 610. The smart contract in distributed ledger 610 decrypts and validates the token. The smart contract processes the conditions to select contact information. The smart contract encrypts and transfers the select contact information to the source user. The smart contract logs data for the transaction and launches new block 2 to handle the next transaction. Source user transceiver 601 encrypts and transfers user data to target user transceiver 602 per the contact information.

To communicate again with the target user, the source user encrypts and transfers the token and target user ID to distributed ledger 610. The smart contract decrypts and validates the token. The smart contract processes the conditions to select contact information. The smart contract encrypts and transfers the select contact information to the source user. The smart contract logs data for the second transaction and launches new block 3 to handle the next transaction. The source user encrypts and transfers user data to the target user per the contact information.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a data communication system to transfer user data between data communication sources and a data communication target, the method comprising:
   a target transceiver transferring target instructions to a control server wherein the target instructions individually associate the data communication sources with contact information, contact conditions, and contact tokens for the data communication target;
   the target transceiver transferring individual ones of the contact tokens for delivery to individual ones of the data communication sources and source transceivers receiving the individual ones of the contact tokens for the individual ones of the data communication sources;
   one of the source transceivers encrypting and transferring a data communication target ID and one of the individual contact tokens for the one of the individual data communication sources to the control server;
   the control server receiving and decrypting the data communication target ID and the encrypted one of the individual contact tokens and identifying the one of the data communication sources, the data communication target, and the contact conditions, and in response, processing the contact conditions to select a portion of the contact information and transferring the selected portion of the contact information to the one of the data communication sources; and
   the one of the source transceivers receiving the selected portion of the contact information and transferring the user data to the data communication target based on the selected portion of the contact information.

2. The method of claim 1 wherein the contact token comprises a photograph or graphic image.

3. The method of claim 1 wherein the contact token comprises video or audio.

4. The method of claim 1 wherein the contact token comprises text.

5. The method of claim 1 the data communication target ID comprises an International Telecommunications Union (ITU) E.164 number for the target transceiver.

6. The method of claim 1 wherein the control server receiving and decrypting the data communication target ID and the encrypted one of the individual contact tokens and identifying the one of the data communication sources, the data communication target, and the contact conditions, and in response, processing the contact conditions to select the portion of the contact information and transferring the selected portion of the contact information to the one of the data communication sources comprises the control server executing a smart contract in a distributed ledger.

7. The method of claim 1 wherein the control server comprises a Telephone Number Mapping (ENUM) server.

8. The method of claim 1 wherein:
the contact conditions require encryption;
the selected portion of the contact information instructs the one of the source transceivers to use a target transceiver public key; and
the one of the source transceivers encrypts the user data with the target transceiver public key.

9. The method of claim 1 wherein:
the contact conditions require encryption;
the selected portion of the contact information instructs the one of the source transceivers to use a source transceiver private key; and
the one of the source transceivers encrypts the user data with the source transceiver private key.

10. The method of claim 1 wherein:
the contact conditions require encryption using the token;
the selected portion of the contact information instructs the one of the source transceivers to use the token; and
the one of the source transceivers encrypts the user data with the token.

11. A data communication system to transfer user data between data communication sources and a data communication target, the method comprising:
a target transceiver configured to transfer target instructions to a control server wherein the target instructions individually associate the data communication sources with contact information, contact conditions, and contact tokens for the data communication target;
the target transceiver configured to transfer individual ones of the contact tokens for delivery to individual ones of the data communication sources and source transceivers configured to receive the individual ones of the contact tokens for the individual ones of the data communication sources;
one of the source transceivers configured to encrypt and transfer a data communication target ID and one of the individual contact tokens for the one of the individual data communication sources to the control server;
the control server configured to receive and decrypt the data communication target ID and the encrypted one of the individual contact tokens and identify the one of the data communication sources, the data communication target, and the contact conditions, and in response, to process the contact conditions to select a portion of the contact information and transfer the selected portion of the contact information to the one of the data communication sources; and
the one of the source transceivers configured to receive the selected portion of the contact information and transfer the user data to the data communication target based on the selected portion of the contact information.

12. The data communication system of claim 11 wherein the contact token comprises a photograph or graphic image.

13. The data communication system of claim 11 wherein the contact token comprises video or audio.

14. The data communication system of claim 11 wherein the contact token comprises text.

15. The data communication system of claim 11 the data communication target ID comprises an International Telecommunications Union (ITU) E.164 number for the target transceiver.

16. The data communication system of claim 11 wherein the control server is configured to execute a smart contract in a distributed ledger.

17. The data communication system of claim 11 wherein the control server comprises a Telephone Number Mapping (ENUM) server.

18. The data communication system of claim 11 wherein:
the contact conditions require encryption;
the selected portion of the contact information instructs the one of the source transceivers to use a target transceiver public key; and
the one of the source transceivers is configured to encrypt the user data with the target transceiver public key.

19. The data communication system of claim 11 wherein:
the contact conditions require encryption;
the selected portion of the contact information instructs the one of the source transceivers to use a source transceiver private key; and
the one of the source transceivers is configured to encrypt the user data with the source transceiver private key.

20. The data communication system of claim 11 wherein:
the contact conditions require encryption using the token;
the selected portion of the contact information instructs the one of the source transceivers to use the token; and
the one of the source transceivers is configured to encrypt the user data with the token.

* * * * *